(12) United States Patent
Ballot et al.

(10) Patent No.: US 8,990,461 B2
(45) Date of Patent: Mar. 24, 2015

(54) ON-THE-GO (OTG) USB DEVICES CONFIGURATION METHOD FOR IDENTIFYING CONFIGURATION OF OTHER CONNECTED DEVICES BY REACTING TO CHANGE IN RESISTANCE VALUE ON A RESISTIVE LINE

(75) Inventors: Nathalie Ballot, Sassenage (FR); Nicholas Florenchie, Draveil (FR)

(73) Assignee: St-Ericsson SA, Plan-Les-Quates (CH)

( * ) Notice: Subject to any disclaimer, the term of this patent is extended or adjusted under 35 U.S.C. 154(b) by 22 days.

(21) Appl. No.: 13/392,016

(22) PCT Filed: Aug. 25, 2010

(86) PCT No.: PCT/EP2010/062377
§ 371 (c)(1),
(2), (4) Date: Feb. 23, 2012

(87) PCT Pub. No.: WO2011/023718
PCT Pub. Date: Mar. 3, 2011

(65) Prior Publication Data
US 2012/0179843 A1 Jul. 12, 2012

(30) Foreign Application Priority Data
Aug. 26, 2009 (EP) .................................. 09305790

(51) Int. Cl.
*G06F 13/00* (2006.01)
*G06F 13/42* (2006.01)
(52) U.S. Cl.
CPC ........... *G06F 13/426* (2013.01); *Y02B 60/1228* (2013.01); *Y02B 60/1235* (2013.01)
USPC .......... 710/72; 710/8; 710/9; 710/10; 710/15; 710/19; 710/73; 710/74; 713/320; 713/321; 713/322; 713/323

(58) Field of Classification Search
USPC ................. 710/8–10, 15–19, 72–74, 306, 14; 713/320–323
See application file for complete search history.

(56) References Cited

U.S. PATENT DOCUMENTS

| 6,256,682 | B1 | 7/2001 | Gudan | |
|---|---|---|---|---|
| 7,360,105 | B2* | 4/2008 | Kato | 713/323 |
| 7,905,754 | B2* | 3/2011 | McCoy | 439/676 |

(Continued)

OTHER PUBLICATIONS

"On-The-Go Supplement to the USB 2.0 Specification—Revision 1.0A", Universal Serial Bus Specification Supplement, 2003 USB Implementers Form, Inc. (USB-IF) Jun. 24, 2003, pp. 1-69, XP001540012, Sections 3.2, 4.2.

(Continued)

*Primary Examiner* — Tammara Peyton
(74) *Attorney, Agent, or Firm* — Coats & Bennett, PLLC

(57) ABSTRACT

The present invention generally relates to the management of a configuration of a first device. The first device includes a control unit and an interface unit managing a communication interface. The communication interface comprises at least one resistive line having a resistance value. The resistance value allows the interface unit to identify a configuration for at least one second device adapted to be linked to the first device via the communication interface. The interface unit: /a/ detects a change of the resistance value on the resistive line corresponding to a configuration of said second device; /b/ processes said change of the resistance value to adapt the configuration of the first device according to the configuration of said second device.

28 Claims, 2 Drawing Sheets

(56) References Cited

U.S. PATENT DOCUMENTS

| | | | |
|---|---|---|---|
| 8,154,857 B2* | 4/2012 | Kendall et al. | 361/679.01 |
| 8,332,664 B2* | 12/2012 | Farrar et al. | 713/300 |
| 8,463,978 B2* | 6/2013 | Sun et al. | 710/316 |
| 8,570,139 B2* | 10/2013 | Lee | 338/215 |
| 8,626,932 B2* | 1/2014 | Lydon et al. | 709/228 |
| 2008/0309313 A1 | 12/2008 | Farrar | |
| 2010/0070659 A1* | 3/2010 | Ma et al. | 710/14 |
| 2012/0271979 A1* | 10/2012 | Considine et al. | 710/306 |

OTHER PUBLICATIONS

"On-The-Go and Embedded Host Supplement to the USB Revision 2.0 Specification", Revision 2.0, Universal Serial Bus Specification Supplement, May 8, 2009, LSI Corporation, Hewlet-Packard Company, Intel Corporation, Microsoft Corporation, NEC Corporation, ST-NXP Wireless Company, pp. 1-79.

* cited by examiner

ON-THE-GO (OTG) USB DEVICES CONFIGURATION METHOD FOR IDENTIFYING CONFIGURATION OF OTHER CONNECTED DEVICES BY REACTING TO CHANGE IN RESISTANCE VALUE ON A RESISTIVE LINE

CROSS-REFERENCE TO RELATED APPLICATIONS

This application is the National Stage of International App. No. PCT/EP2010/062377, filed Aug. 25, 2010, which claims priority to European App. No. EP09305790.9, filed Aug. 26, 2009, all of which are hereby incorporated by reference as if fully set forth herein.

FIELD OF THE INVENTION

The present invention generally relates to the configuration management of devices. In particular, the invention is applicable to USB On-The-Go devices.

RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The concept of On-The-Go (OTG) devices has been developed in addition to the specifications of the Universal Serial Bus (USB), originally designed as an interface between Personal Computers (PCs) and peripherals. In particular, the specification "On-The-Go and Embedded Host Supplement to the USB Revision 2.0 Specification"—Revision 2.0—May 8, 2009 has been introduced to allow many devices, for example mobile phones or cameras, that are not PCs in the classic sense, to connect directly to peripherals, without requiring them to support the full range of USB peripherals.

Typically, in order to manage a USB interface, an OTG device comprises a control unit, said unit being generally implemented, in large part, in the form of a computer program, and an interface unit generally made up, in large part, of hardware components. The control unit requires the use of a high speed clock (typically 60 MHz) to work.

An OTG device is configured according notably to the configurations of devices connected to the USB interface and user actions. For example, the OTG device can act as a Host or as a Peripheral. Any changes in the configuration of devices connected to the USB interface and user actions must be processed by the OTG device to adapt its own configuration.

It is possible to detect such changes by measuring variations of physical characteristics on the USB interface. The OTG device reacts to a change in the configuration as explained hereinafter. On detection of a variation, the interface unit of the OTG device sends this information to the control unit. The control unit interprets the variation and gives instruction to the interface unit in writing flags or instructions via serial registers or by sending back commands to the interface unit.

This approach relies on a dialog between the control unit and the interface unit. A drawback of this solution is that it introduces latencies in the processing of a change of the configuration, since several entities must cooperate and the control unit is mainly implemented by the way of a software executed by a processor with limited resources. Moreover, it creates additional power consumption needs as the involvement of the control unit requires the use of a high speed clocks and processing power.

SUMMARY

To address these needs, an embodiment relates to a method for managing a configuration of a first device including a control unit and an interface unit managing a communication interface. The communication interface comprises at least one resistive line having a resistance value. The resistance value allows the interface unit to identify a configuration for at least one second device adapted to be linked to the first device via the communication interface. The method comprises on the interface unit the following steps:
/a/ detecting a change of the resistance value on the resistive line corresponding to a configuration of said second device;
/b/ processing said change of the resistance value to adapt the configuration of the first device according to the configuration of said second device.

Thanks to an embodiment, upon detection of a change in the resistance value on the resistive line, the processing of this event is handled by the interface unit. In fact, the Interface unit manages the detection, the identification and the processing of this event. Contrary to the control unit generally implemented in the form of a computer program, the interface unit is generally made up in large part of hardware components. The processing of the event does not need anymore the involvement of the control unit. Thus, it is not anymore necessary to establish a bi-directional communication between the interface unit and the control unit, the interface unit being able to react almost instantly to a change of the configuration. It is then evident that latencies are reduced and power consumption can also be drastically scaled down.

This embodiment is also interoperable with existing devices, in particular USB On-The-Go devices, thus allowing a faster response time compared to known solutions.

The step /b/ can comprise any combination of the following steps:
    adapting a power supply to the communication interface; and/or,
    adapting a clearance to charge from the communication interface; and/or;
    adapting an authorization to check a session between the first device and said second device; and/or,
    defining a role of the first device on the communication interface amongst Host or Peripheral.

An adapter can be coupled in-between the first device and the second device. The adapter allows, on the communication interface, the connection of the second device and a charger to supply power to the communication interface. The adapter is adapted to modify the resistance value of said resistive line according to a connection state of said charger to the adapter and according to the configurations of the first device and the second device.

The communication interface may be compliant with the Universal Serial Bus specifications.

A second aspect of an embodiment relates to an Interface unit in a first device comprising a control entity and a communication interface able to link said first device to at least one second device. The communication interface comprises at least one resistive line having a resistance value. The resistance value allows the interface unit to identify a configuration of the second device. The interface unit comprises:
    a configuration change detection unit capable of detecting a change of the resistance value on the resistive line;

a configuration unit capable of processing said change of the resistance value to adapt the configuration of the first device according to the configuration of the second device.

The configuration unit can be capable of:

adapting a power supply to the communication interface of the first device; and/or, adapting a clearance to charge from the communication interface of the first device; and/or, adapting an authorization on the first device to check a session between the first device and said second device; and/or, defining a role of the first device on the communication interface amongst Host or Peripheral.

The communication interface can be compliant with the Universal Serial Bus specifications.

A third aspect of an embodiment relates to a device comprising an Interface unit according to the second aspect of the invention.

A fourth aspect of an embodiment relates to a system comprising a first device according to the third aspect of an embodiment and at least one second device adapted to be linked to the first device via the communication interface.

The system can also comprise an adapter coupled in-between the first device and the second device. The adapter allows, on the communication interface, the connection of the second device and a charger to supply power to the communication interface. The adapter is adapted to modify the resistance value of said resistive line according to a connection state of said charger to the adapter and according to the configurations of the first device and the second device.

BRIEF DESCRIPTION OF THE DRAWINGS

The present embodiment is illustrated by way of example, and not by way of limitation, in the figures of the accompanying drawings and in which like reference numerals refer to similar elements and in which.

DESCRIPTION OF PREFERRED EMBODIMENTS

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

According to a classical USB connection between two devices, one device is a Host and the other is a Peripheral. A Host is a physical entity acting as a host and generally includes a USB Host Controller. A Peripheral is a physical entity that performs a function.

An USB interface comprises up to five physical lines: ground GND, power supply VBUS, data link D+ and D−, resistance ID. The resistance ID line of an USB interface can be qualified as a resistivity line. Typically, an USB interface comprises a cable with up to five wires equipped at each end with a connector designed to be connected to a USB connector, with up to five contacts.

Considering the USB terminology, a Session is the period of time that VBUS is powered up. An A-device is a Host at the start of a session and supplies power to VBUS. A B-device is a Peripheral at the start of a session. During a session, the role of host can be transferred back and forth between the A-device and the B-device any number of times. The session ends when applications running on it have completed.

An OTG device is a portable device that uses an USB connector to operate sometimes as a Host and sometimes as a Peripheral. Consequently, OTG devices can be attached to each other. For example, a mobile phone is a Peripheral when it is connected via a removable USB cable to a computer acting as a Host. The same mobile phone is a Host for an USB storage key or a printer acting as Peripherals.

Figure 1:
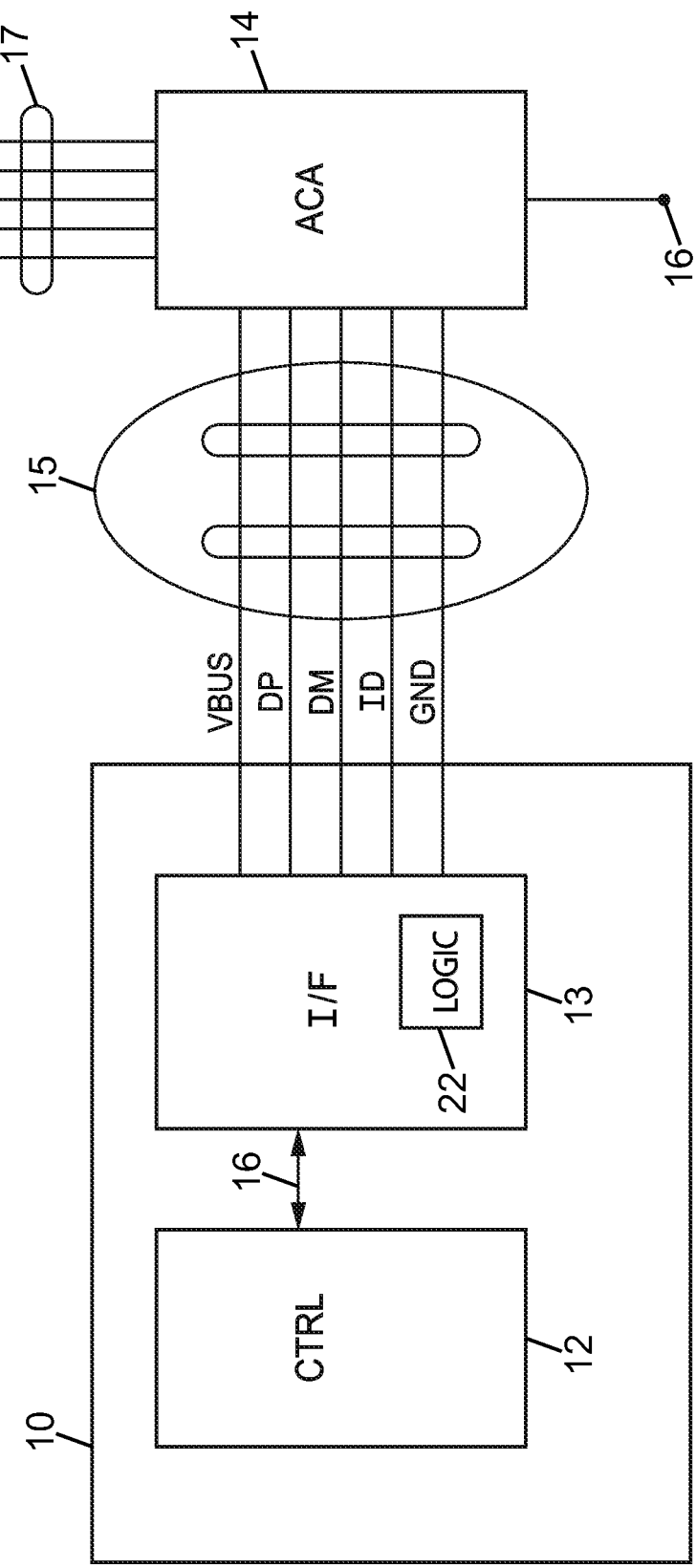
FIG. 1 is a schematic block diagram of an OTG device according to an embodiment.

Referring now to FIG. 1, there is shown therein a block diagram of an OTG device 10 according to an aspect of an embodiment, connected via a first USB interface 15 to an Accessory Charging Adapter (ACA) device 14. By way of an example, the OTG device 10 can be a mobile phone, a personal assistant, an embedded device . . . .

The features and the behaviour of ACA Devices are detailed in the chapter 6 of the USB specification "Battery Charging Specification"—Revision 1.1—Apr. 15, 2009. Also this document generally deals with charging and/or powering up from dedicated chargers, hosts, hubs and charging downstream ports.

In particular, the ACA device 14 is a USB device allowing the connection to the first USB interface 15 of:

a charger via an input 16; and a USB accessory via a second USB interface 17.

The input 16 might be a USB interface or any another kind of interface, for example a co-axial connector to accommodate the output of a charger plugged into an electrical outlet. The ACA device 14 supplies power, through the charger when the former is connected to the input 16, on the VBUS line of the first USB interface 15 and the second USB interface 17. It has also to be pointed out that data transfers between the OTG device and the accessory are maintained, in a transparent manner independently of the presence of the ACA device.

The OTG device 10 comprises a control unit 12, said unit being generally implemented, in large part, in the form of a computer program, and an interface unit 13 is generally made up in large part of hardware components. Said control unit 12 and said interface unit 13 are coupled via an interface 16. The control unit 12 requires the use of a high speed clock (typically 60 MHz) to work.

In the following description, by configuration it should be understood any combination of hardware or software components determining the essential characteristics of a device in operation. Several configurations of the OTG device may arise. In particular, the OTG device 10 can act as a Host or as a Peripheral. The charger may be present or not. The main different configurations are summed up hereinafter:

(a) OTG Device as an A-Device, Accessory as a B-device and no-charger present;

(b) OTG Device as a B-Device, Accessory as an A-device and charger present;

(c) OTG Device as a B-Device, no Accessory connected and charger present;

(d) OTG Device as an A-Device, Accessory as a B-device and charger present;

(e) OTG Device as a B-Device, Accessory as a A-device or no Accessory connected and charger not present.

The ACA device 14 is designed to identify the current configuration by detecting which device is connected to its input 16, its first USB interface 15 and its second USB interface 17. This information is communicated by the ACA device 14 to the OTG device 10. The ACA device 14 modifies the resistance value of the resistance ID line in connecting an appropriate resistance on the resistance ID line of the USB interface 15. Then, the OTG device 10 can determine the current configuration by checking the value of the resistance R of the resistance ID line of the USB interface 15. As described in the USB specifications, each configuration corresponds to a given value of the resistance R:

Configuration (a): R<1 kOhms;
Configuration (b): R=37 kOhms;
Configuration (c): R=68 kOhms;
Configuration (d): R=124 kOhms;
Configuration (e): R>220 kOhms.

The OTG device must adapt its configuration for the first USB interface following a change of configuration. For example, if the OTG device was acting as a Host and a charger was present (configuration (d)), only the ACA device 14 was providing power to the VBUS line of the first USB interface 15. On removal of the charger (configuration (a)), the OTG device must provide power to the VBUS line of the first USB interface 15.

In the description above, the architecture of the OTG device 10 is based on two different chips respectively for the control unit 12 and for the interface unit 13 linked with the interface 16. However, it will be understood by those skilled in the art that various other modifications may be made, and equivalents may be substituted, without departing from the true scope of the present invention. In particular, the control unit 12 and the interface unit 13 could be grouped for example on one chip.

The interface unit 13 comprises itself logic blocks 22. Logic blocks 22 are capable of adapting the configuration of the OTG device upon detection of a value change of the resistance R of the Resistance ID line of the first USB interface 15. To this end, logic blocks 22 comprise gates to receive such a value change and to emit suitable commands depending on the current configuration in order to configure the OTG device 10. In particular, logic blocks 22 can configure the OTG device to:

supply or not power to the VBUS line of the first interface 15;
enable or not charging from or to the VBUS line of the first interface 15;
check if a session is valid or not.

In one embodiment, notably adapted to manage the connection of an ACA device on the first interface 15, the logic blocks 22 are designed to configure the OTG device according to the following rules:

upon transition from configuration -d- (OTG Device as an A-Device, Accessory as a B-device and charger present) to configuration -a- (OTG Device as an A-Device, Accessory as a B-device and no-charger present), then:
disable charging from VBUS;
supply power to VBUS;

upon transition from configuration -a- (OTG Device as an A-Device, Accessory as a B-device and no-charger present) to configuration -d- (OTG Device as an A-Device, Accessory as a B-device and charger present), then:
enable charging from VBUS;
turn off power supply to VBUS;

upon transition from configuration -b- (OTG Device as a B-Device, Accessory as an A-device and charger present) to configuration -c- (OTG Device as a B-Device, no Accessory connected and charger present), configuration -d- (OTG Device as an A-Device, Accessory as a B-device and charger present), or configuration -e- (OTG Device as a B-Device, Accessory as a A-device or no Accessory connected and charger not present), then:
check the validity of the session;

upon transition from configuration -e- (OTG Device as a B-Device, Accessory as a A-device or no Accessory connected and charger not present) to configuration -b- (OTG Device as a B-Device, Accessory as an A-device and charger present), configuration -c- (OTG Device as a B-Device, no Accessory connected and charger present), or configuration -d- (OTG Device as an A-Device, Accessory as a B-device and charger present), then:
enable charging from VBUS.

In one embodiment, the logic blocks 22 are implemented using combinatorial logic blocks and/or logic circuits and/or truth tables. Such logic blocks 22 are efficient since they are characterized by their low-latency, their speed and their very low power consumption, no clock or active component being involved.

Following the detection of a change of the configuration, the interface unit 13 transmits this information to the controller unit 12 via the interface 16.

Figure 2:
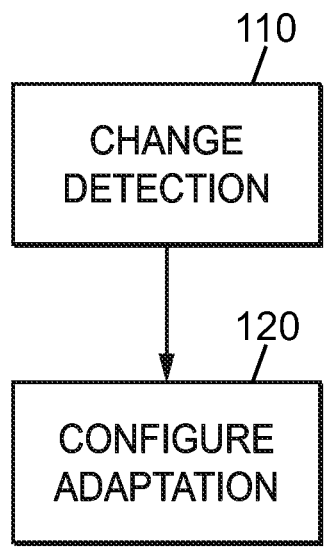
FIG. 2 is a flow chart illustrating steps of a method according to an embodiment.

Referring now to the FIG. 2, there is shown therein a flow chart illustrating steps of a method to process a change of the configuration, according to an aspect of an embodiment.

Initially, the OTG device is in a first configuration (-a-, -b-, -c-, -d- or -e-) corresponding to a given first value of the resistance R of the Resistance ID line of the first USB interface 15.

In a first step 110, the interface unit 13 detects a value change of the resistance value R on the Resistance ID line of the first USB interface 15.

In a second step 120, the interface unit 13 processes the change of the resistance R to configure the OTG device.

In particular, the OTG device can be configured to:
supply or not power to the VBUS line of the first interface 15; and/or,
enable or not charging from or to the VBUS line of the first interface 15; and/or
check if the session is valid or not.

In one embodiment, notably adapted to manage the connection of an ACA device on the first interface 15, in the second step 120, the OTG device can be configured to:
if the first configuration was configuration -d- (OTG Device as an A-Device, Accessory as a B-device and charger present), and the second configuration is configuration -a- (OTG Device as an A-Device, Accessory as a B-device and no-charger present),
disable charging from VBUS;
supply power to VBUS;
if the first configuration was -a- (OTG Device as an A-Device, Accessory as a B-device and no-charger present), and the second configuration is configuration -d-, then:
enable charging from VBUS;
turn off power supply to VBUS;
if the first configuration was configuration -b- (OTG Device as a B-Device, Accessory as an A-device and charger present), and the second configuration is either configuration -c- (OTG Device as a B-Device, no Accessory connected and charger present), configuration -d- (OTG Device as an A-Device, Accessory as a B-device and charger present), or configuration -e- (OTG Device as a B-Device, Accessory as a A-device or no Accessory connected and charger not present), then:
check the validity of the new session;

if the first configuration was configuration -e- (OTG Device as a B-Device, Accessory as a A-device or no Accessory connected and charger not present)), and the second configuration is either configuration -b- (OTG Device as a B-Device, Accessory as an A-device and charger present), configuration -c- (OTG Device as a B-Device, no Accessory connected and charger present), or configuration -d- (OTG Device as an A-Device, Accessory as a B-device and charger present), then: enable charging from VBUS.

Figure 3:
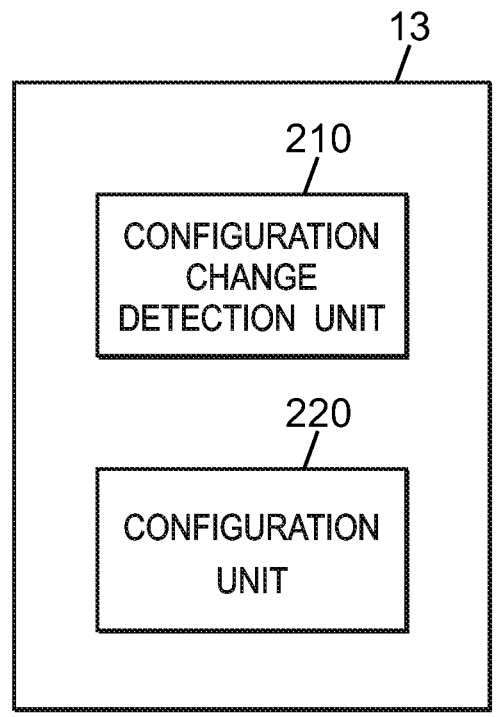
FIG. 3 is a block diagram of an interface unit in an OTG device comprising notably a control entity and an USB interface, according to an aspect of an embodiment.

Referring now to FIG. 3, there is shown therein a block diagram of an interface unit 13 in an OTG device 10 comprising notably a control entity and an USB interface, according to an aspect of an embodiment. The interface unit can link the OTG device to at least one second device via the first USB interface 15. It comprises:
- a configuration change detection unit 210 capable of detecting a change of the resistance value on the resistive line of the first USB interface, namely the resistance ID line;
- a configuration unit 220 capable of processing said change of the resistance value to adapt the configuration of the OTG device according to the configuration of the second device.

While there has been illustrated and described what are presently considered to be the preferred embodiments, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

It is stipulated that the reference signs in the claims do not limit the scope of the claims, but are merely inserted to enhance the legibility of the claims.

What is claimed is:

1. A method for managing a configuration of a first device including a control unit and an interface unit managing a communication interface, the communication interface comprising at least one resistive line having a resistance value, the resistance value allowing the interface unit to identify a configuration for at least one second device adapted to be linked to the first device via the communication interface, the method comprising:
   detecting, by the interface unit, a change of the resistance value on the resistive line corresponding to a configuration of the second device; and
   processing, by the interface unit, the change of the resistance value to adapt the configuration of the first device according to the configuration of the second device;
   wherein the interface unit does not communicate the detected change in the resistance value to the control unit prior to adapting the configuration of the first device.

2. The method according to claim 1, wherein processing the change of the resistance value to adapt the configuration of the first device according to the configuration of the second device further comprises adapting a power supply to the communication interface.

3. The method according to claim 1, wherein processing the change of the resistance value to adapt the configuration of the first device according to the configuration of the second device further comprises adapting a clearance to charge from the communication interface.

4. The method according to claim 1, wherein processing the change of the resistance value to adapt the configuration of the first device according to the configuration of the second device further comprises adapting an authorization to check a session between the first device and the second device.

5. The method according to claim 1, wherein processing the change of the resistance value to adapt the configuration of the first device according to the configuration of the second device further comprises defining a role of the first device on the communication interface amongst one of a host and a peripheral.

6. The method according to claim 1, wherein an adapter is coupled between the first device and the second device, the adapter allowing, on the communication interface, the connection of the second device and a charger to supply power to the communication interface, the adapter being adapted to modify the resistance value of the resistive line according to a connection state of the charger to the adapter and according to the configurations of the first device and the second device.

7. The method according to claim 1, wherein the communication interface is compliant with Universal Serial Bus specifications.

8. An interface unit in a first device, the first device including a control entity and a communication interface that links the first device to at least one second device, the communication interface comprising at least one resistive line having a resistance value, the resistance value allowing the interface unit to identify a configuration of the second device, the interface unit comprising:
   a configuration change detection unit that detects a change of the resistance value on the resistive line; and
   a configuration unit that processes the change of the resistance value to adapt the configuration of the first device according to the configuration of the second device without communicating the detected change in the resistance value to the control entity prior to adapting the configuration of the first device.

9. The interface unit according to claim 8, wherein the configuration unit adapts a power supply to the communication interface of the first device.

10. The interface unit according to claim 8, wherein the configuration unit adapts a clearance to charge from the communication interface of the first device.

11. The interface unit according to claim 8, wherein the configuration unit adapts an authorization on the first device to check a session between the first device and the second device.

12. The interface unit according to claim 8, wherein the configuration unit defines a role of the first device on the communication interface as one of a host and a peripheral.

13. The interface unit according to claim 8, wherein the communication interface is compliant with the Universal Serial Bus specifications.

14. A device including an interface unit, a control entity, and a communication interface that links the device to at least one second device, the communication interface comprising at least one resistive line having a resistance value that allows the interface unit to identify a configuration of the second device, the device comprising:
   a configuration change detection unit that detects a change of the resistance value on the resistive line; and
   a configuration unit that processes the change of the resistance value to adapt the configuration of the device according to the configuration of the second device without communicating the detected change in the resistance value to the control entity prior to adapting the configuration of the device.

15. A system comprising:
a first device including an interface unit, a control entity, and a communication interface;
a second device adapted to be linked to the first device via the communication interface;
the communication interface comprising at least one resistive line having a resistance value that allows the interface unit to identify a configuration of the second device;
the first device having a configuration change detection unit that detects a change of the resistance value on the resistive line; and
the first device having a configuration unit that processes the change of the resistance value to adapt the configuration of the first device according to the configuration of the second device without communicating the detected change in the resistance value to the control entity prior to adapting the configuration of the device.

16. The system according to claim 15, further comprising an adapter coupled between the first device and the second device, the adapter allowing, on the communication interface, the connection of the second device and a charger to supply power to the communication interface, the adapter being adapted to modify the resistance value of the resistive line according to a connection state of the charger to the adapter and according to the configurations of the first device and the second device.

17. A method for managing a configuration of a first device including a control unit and an interface unit managing a communication interface, the communication interface comprising at least one resistive line having a resistance value, said resistance value allowing the interface unit to identify a configuration for at least one second device adapted to be linked to the first device via the communication interface, wherein an adapter is coupled in-between the first device and the second device, the adapter allowing, on the communication interface, the connection of the second device and a charger to supply power to the communication interface, the adapter being adapted to modify the resistance value of said resistive line according to a connection state of said charger to the adapter and according to the configurations of the first device and the second device, said method comprising, on the interface unit:
detecting a change of the resistance value on the resistive line corresponding to a configuration of said second device;
processing said change of the resistance value to adapt the configuration of the first device according to the configuration of said second device.

18. The method according to claim 17, wherein processing said change of the resistance value to adapt the configuration of the first device according to the configuration of said second device comprises adapting a power supply to the communication interface.

19. The method according to claim 17, wherein processing said change of the resistance value to adapt the configuration of the first device according to the configuration of said second device comprises adapting a clearance to charge from the communication interface.

20. The method according to claim 17, wherein processing said change of the resistance value to adapt the configuration of the first device according to the configuration of said second device comprises adapting an authorization to check a session between the first device and said second device.

21. The method according to claim 17, wherein processing said change of the resistance value to adapt the configuration of the first device according to the configuration of said second device comprises defining a role of the first device on the communication interface amongst Host or Peripheral.

22. The method according to claim 17, wherein the communication interface is compliant with the Universal Serial Bus specifications.

23. An interface unit in a first device comprising a control entity and a communication interface able to link said first device to at least one second device, the communication interface comprising at least one resistive line having a resistance value, said resistance value allowing the interface unit to identify a configuration of the second device, characterized in that said interface unit comprises:
a configuration change detection unit capable of detecting a change of the resistance value on the resistive line; and
a configuration unit capable of processing said change of the resistance value to adapt the configuration of the first device according to the configuration of the second device;
wherein an adapter is coupled in-between the first device and the second device, the adapter allowing, on the communication interface, the connection of the second device and a charger to supply power to the communication interface, the adapter being adapted to modify the resistance value of said resistive line according to a connection state of said charger to the adapter and according to the configurations of the first device and the second device.

24. The interface unit according to claim 23, wherein the configuration unit is capable of adapting a power supply to the communication interface of the first device.

25. The interface unit according to claim 23 wherein the configuration unit is capable of adapting a clearance to charge from the communication interface of the first device.

26. The interface unit according to claim 23, wherein the configuration unit is capable of adapting an authorization on the first device to check a session between the first device and said second device.

27. The interface unit according to claim 23, wherein the configuration unit is capable of defining a role of the first device on the communication interface amongst Host or Peripheral.

28. The interface unit according to claim 23, wherein the communication interface is compliant with the Universal Serial Bus specifications.

* * * * *

UNITED STATES PATENT AND TRADEMARK OFFICE
CERTIFICATE OF CORRECTION

| | | |
|---|---|---|
| PATENT NO. | : 8,990,461 B2 | Page 1 of 1 |
| APPLICATION NO. | : 13/392016 | |
| DATED | : March 24, 2015 | |
| INVENTOR(S) | : Nathalie Ballot and Nicolas Florenchie | |

It is certified that error appears in the above-identified patent and that said Letters Patent is hereby corrected as shown below:

On the Title Page

(54) Title: Delete "ON-THE-GO (OTG) USB DEVICES CONFIGURATION METHOD FOR IDENTIFYING CONFIGURATION OF OTHER CONNECTED DEVICES BY REACTING TO CHANGE IN RESISTANCE VALUE ON A RESISTIVE LINE" and insert -- MANAGEMENT OF A CONFIGURATION OF A DEVICE BASED ON IDENTIFYING A CONFIGURATION OF ANOTHER DEVICE USING A RESISTIVE LINE --, therefor.

(75) Inventors: Delete "Nicholas Florenchie" and insert -- Nicolas Florenchie --, therefor.

(73) Assignee: Delete "St-Ericsson SA, Plan-Les-Quates (CH)"" and insert -- ST-Ericsson SA, Plan-les-Ouates (CH) --, therefor.

In the Specification

In Column 1, Lines 1-6, delete "ON-TO-GO (OTG) USB DEVISED CONFIGURATION METHOD FOR INDENTIFYING CONFIGURATION OF OTHER CONNECTED DEVICES BY REACTION TO CHANGE IN RESISTANCE VALUE TO A RESISTIVE LINE" and insert -- MANAGEMENT OF A CONFIGURATION OF A DEVICE BASED ON IDENTIFYING A CONFIGURATION OF ANOTHER DEVICE USING A RESISTIVE LINE --, therefor.

In Column 6, Line 33, delete "Ron" and insert -- R on --, therefor.

Signed and Sealed this
Twenty-ninth Day of March, 2016

Michelle K. Lee
*Director of the United States Patent and Trademark Office*